United States Patent

Mikhail et al.

Patent Number: 5,569,314
Date of Patent: Oct. 29, 1996

[54] THERMAL STABILIZATION OF STEELMAKING SLAG

[75] Inventors: Shaheer Mikhail, Nepean; Anne-Marie Turcotte, Aylmer, both of Canada

[73] Assignee: Energy Mines & Resources-Canada, Ottawa, Canada

[21] Appl. No.: 380,701

[22] Filed: Jan. 30, 1995

[51] Int. Cl.$^6$ ........................................ C22B 7/04
[52] U.S. Cl. .................. 75/434; 65/19; 423/432
[58] Field of Search ................... 75/434; 65/19; 423/432

[56] References Cited

U.S. PATENT DOCUMENTS

| | | | |
|---|---|---|---|
| 747,919 | 12/1903 | Passow. | |
| 813,965 | 2/1906 | Grau. | |
| 903,062 | 11/1908 | Dresler. | |
| 1,947,488 | 2/1934 | Newhouse | 49/77.5 |
| 2,017,889 | 10/1935 | Bowyer | 49/77.5 |
| 2,819,172 | 5/1954 | Trief | 106/102 |
| 3,523,775 | 8/1970 | Rueckl | 65/19 |
| 3,925,069 | 12/1975 | Shimada et al. | 75/3 |
| 4,468,253 | 8/1984 | Tajima et al. | 106/97 |
| 4,731,120 | 3/1988 | Tuuti | 106/97 |
| 4,968,349 | 11/1990 | Virtanen | 106/707 |

FOREIGN PATENT DOCUMENTS

| | | | |
|---|---|---|---|
| 131504 | 10/1979 | Japan | 75/434 |
| 89412 | 7/1980 | Japan | 65/19 |

*Primary Examiner*—Melvyn Andrews

[57] ABSTRACT

A thermally stable steelmaking slag is produced which is suitable for use in applications requiring dimensional stability, e.g. as aggregate in road construction. Fine particles of slag obtained from a basic oxygen furnace operation or from an arc furnace operation is firstly subjected to a thermal hydration at a temperature in the range of about 100° to 400° C. Thereafter, the hydrated slag particles are carbonated in the presence of carbon dioxide at a temperature in the range of about 500° to 900° C., whereby substantially all free calcium oxide in the slag particles is converted to calcium carbonate. The product obtained is well suited for road construction and cementitious applications.

6 Claims, No Drawings

THERMAL STABILIZATION OF STEELMAKING SLAG

BACKGROUND OF THE INVENTION

This invention relates to a process for thermally stabilizing steelmaking slag such that it can be used in applications requiring dimensional stability, e.g. as aggregate in road construction and cementitious applications.

Major steelmaking processes such as the basic oxygen furnace operation and the electric arc furnace operation, produce large quantities of slag. A large proportion of this slag is treated as a waste material and there is a great need to be able to adapt this waste material to useful purposes.

In steelmaking, the slag is normally air cooled, crushed and processed to recover the contained metallics. Some of the slag is then recycled to the blast furnace while a significant proportion is used in road construction due to its very high stability and skid and wear resistance. In recent years, however, use of slag in road construction has been quite severely restricted in many regions because of an undesirable expansion of the slag aggregate leading to a rapid deterioration of the roads. The volume expansion of the slag is attributed to the short and long term hydration of contained calcium and magnesium oxides. Because of this problem, a significant proportion of the slag that is now produced is being stockpiled while attempts are being made to resolve the problem and reinstate slag as a viable road construction material or to find other high volume applications for this material.

Systems for treating blast furnace slag have been described in the past and, for instance, Passow, U.S. Pat. No. 747,919 describes a process in which water-granulated blast furnace slag was moistened and then heated to about 1,200° C. The slag was preferably treated with carbon dioxide while being heated so as to produce a highly cementitious material.

In Dresler, U.S. Pat. No. 903,062, a process for producing material for manufacturing bricks is described. In this case, water granulated slag was mixed with ground slag that had been solidified in the open air and this mixture was molded. The molded product was then subjected to the action of carbonic acid under pressure for the purpose of acting on any free lime that was present.

It is the object of the present invention to provide an improved process for the treatment of particles of steelmaking slag such that the particles become dimensionally stable on hydration.

SUMMARY OF THE INVENTION

This invention in its broadest aspect relates to a process for thermally stabilizing slag from a steelmaking process comprising the steps of (a) thermally hydrating particles of steelmaking slag at a temperature in the range of about 100°–400° C. and (b) thereafter subjecting the hydrated slag particles to carbonation in the presence of carbon dioxide at a temperature in the range of about 500°–900° C., whereby substantially all calcium hydroxide in the slag particles is converted to calcium carbonate.

The slag is preferably obtained from a basic oxygen furnace operation, although it may also be obtained from an arc furnace operation. The slag is preferably ground to a relatively small particle size, e.g. less than about 0.2 mm.

The thermal hydration can conveniently be carried out by contacting the slag particles with a stream of moist saturated air in a heated vessel. The hydration is typically carried out at a temperature in the range of about 100°–400° C., with a temperature of at least 150° C. being optimum. At temperatures below about 100° C., the kinetics of hydration are quite slow and the hydration occurs as a rim around the particle with an inner unhydrated core. It is essential that the hydration takes place efficiently throughout the particle because the subsequent carbonization step is dependent on the diffusion of water from and the diffusion of carbon dioxide into the micropores of the particle. The maximum possible temperature is the decomposition temperature of calcium hydroxide which is about 400° C.

Similar to the hydration, the carbonation occurs most effectively at higher temperatures above 500° C., preferably at least 550° C. At lower temperatures below about 500° C. the carbonation tends to take place at the outer layer of the particle, significantly slowing down the carbonation of the core, since carbon dioxide has to diffuse towards the core through this carbonate layer. The upper temperature limit is determined by the decomposition of the carbonate, which can occur in the temperature range of 700°–900° C., depending on the partial pressure of carbon dioxide around the particle. The higher the partial pressure, the higher the decomposition temperature.

DESCRIPTION OF THE PREFERRED EMBODIMENTS

EXAMPLE 1

A basic oxygen furnace slag was obtained from a Canadian steel company. The chemical analysis of the slag indicated the presence of 18.2% Fe, 25.7% Ca, 6.6% Mg, 4.9% Mn, 0.21 Na, 10.7% $SiO_2$, 2.3% $Al_2O_3$, 0.36% $TiO_2$ and other trace elements. This slag had a density of 3.45 $g/m^3$. The mineralogical characterization indicated that the major phases in the slag are calcium silicates, iron oxides and complex ferrites. Calcium hydroxide was also found to be present as an intermediate constituent and calcium oxide as a minor constituent.

The slag was ground to particles of less than about 0.2 mm and this finely ground slag was subjected to a stream of moisture-saturated air and heated at 20° C./min to 250° C. while monitoring the weight gain due to hydration. After completing the hydration, the flow of moist saturated air was replaced by carbon dioxide, causing carbonation to occur. Maximum carbonation was achieved at 550° C. When the carbonation was completed, the material was examined by thermal techniques to determine whether it contained calcium hydroxide. The results indicated that all of the calcium hydroxide was converted to carbonate. The material was then subjected to hydration in moisture-saturated air under the same conditions as before i.e. heating at 20° C./min to 250° C. It was found that no hydration took place. These results indicate the stability of the material and that the stabilization is achieved by stabilizing the free lime, the main cause of the expansivity of the slag.

We claim:

1. A process for thermally stabilizing slag from a steelmaking process which comprises (a) thermally hydrating particles of steelmaking slag at a temperature in the range of about 100°–400° C. whereby hydrated slag particles are obtained in which hydration has taken place throughout the particles and (b) thereafter subjecting the hydrated slag particles to carbonation in the presence of carbon dioxide at a temperature in the range of about 500°–900° C., whereby water is diffused from and carbon dioxide is diffused into micropores in the particles, resulting in substantially all calcium hydroxide formed throughout the slag particles during hydration being converted to calcium carbonate.

2. A process according to claim 1 wherein the slag is obtained from a basic oxygen furnace operation or an electric arc furnace operation.

3. A process according to claim 2 wherein the slag is in the form of small particles.

4. A process according to claim 2 wherein the slag particles have sizes of less than about 0.2 mm.

5. A process according to claim 2 wherein the hydration is conducted by contacting the slag particles with a stream of moisture saturated air in a heated vessel.

6. A process according to claim 5 wherein the carbonation is conducted at a temperature of at least about 550° C.

* * * * *